United States Patent
Rhy et al.

(10) Patent No.: US 6,700,113 B1
(45) Date of Patent: Mar. 2, 2004

(54) METHOD, APPARATUS, AND SYSTEM FOR REDUCING INTENSITY MODULATION

(75) Inventors: Hee Yeal Rhy, Taejon (KR); Seok-Hyun Yun, Santa Clara, CA (US); Wayne V. Sorin, Mountain View, CA (US)

(73) Assignee: Novera Optics, Inc., Palo Alto, CA (US)

(*) Notice: Subject to any disclaimer, the term of this patent is extended or adjusted under 35 U.S.C. 154(b) by 0 days.

(21) Appl. No.: 10/058,558

(22) Filed: Jan. 28, 2002

(51) Int. Cl.⁷ .................................................. G01J 1/04
(52) U.S. Cl. ............................. 250/227.12; 250/227.18
(58) Field of Search ....................... 250/227.12, 227.18, 250/227.21, 227.23; 385/24, 7, 1; 359/140, 152, 154, 180, 188, 189, 195

(56) References Cited

U.S. PATENT DOCUMENTS

| | | | |
|---|---|---|---|
| 4,781,425 A | 11/1988 | Risk et al. | |
| 4,828,350 A | 5/1989 | Kim et al. | |
| 4,915,468 A | 4/1990 | Kim et al. | |
| 5,022,732 A | 6/1991 | Engan et al. | |
| 5,408,091 A * | 4/1995 | Perraud et al. ........ 250/227.18 |
| 5,583,516 A * | 12/1996 | Lembo ........................ 342/375 |
| 5,708,736 A | 1/1998 | Steinblatt | |
| 5,929,430 A * | 7/1999 | Yao et al. .................... 250/205 |
| 6,021,237 A | 2/2000 | Kim et al. | |
| 6,038,359 A | 3/2000 | Moslehi et al. | |
| 6,233,379 B1 | 5/2001 | Kim et al. | |
| 6,253,002 B1 | 6/2001 | Kim et al. | |
| 6,266,462 B1 | 7/2001 | Kim et al. | |
| 6,532,323 B2 | 3/2003 | Kim et al. | |
| 2001/0019436 A1 * | 9/2001 | Nakajima et al. ........... 359/110 |

* cited by examiner

*Primary Examiner*—Diego Gutierrez
*Assistant Examiner*—Tania Courson
(74) *Attorney, Agent, or Firm*—Blakely, Sokoloff, Taylor & Zafman LLP

(57) ABSTRACT

An apparatus is provided in which multiple devices are connected in series forming a signal path through which a signal propagates. Each device may have one or more operating frequencies and each operating frequency may generate a corresponding intensity modulation with respect to the signal. For one embodiment, the apparatus includes multiple delay lines through which the signal travels. The length of each delay line is configured to reduce the intensity modulation generated by each device based upon one or more factors including the one or more operating frequencies associated with each device and multiple null orders corresponding to different lengths of the delay lines.

60 Claims, 10 Drawing Sheets

METHOD, APPARATUS, AND SYSTEM FOR REDUCING INTENSITY MODULATION

CROSS-REFERENCE TO RELATED APPLICATIONS

The present application is related to U.S. patent application Ser. No. 09/738,282, filed Dec. 14, 2000, now U.S. Pat. No. 6,532,323. The present application is also related to U.S. patent application Ser. No. 09/571,092, filed May 15, 2000, now U.S. Pat. No. 6,253,002.

FIELD OF THE INVENTION

The present invention relates to the fields of communications and optics. More specifically, the present invention relates to a method, apparatus, and system for reducing intensity modulation of acousto-optic tunable filters (AOTFs).

BACKGROUND OF THE INVENTION

When an acousto-optic tunable filter (AOTF) is operating, radio frequency (rf) energy is used to bring about the coupling between two optical modes by the form of acoustic wave. During the acousto-optic coupling, unwanted rf intensity modulations are added to an optical signal that passes through the AOTF because of the frequency shifted optical wave components that come from static coupling, acoustic reflection, and cross talk between different rf frequencies. Intensity modulation can cause signal degradation by increasing bit error in a communication system (e.g., optical transmission system).

U.S. Pat. No. 6,253,002 and U.S. patent application Ser. No. 09/738,282, disclose a method for reducing intensity modulation using a single delay line. An example of a system using a single delay line to reduce the intensity modulation generated by a device (e.g., an AOTF) is shown in FIG. 1A. As illustrated in FIG. 1A, a system 100 (also referred to as a reflecting system herein) may include a device (e.g., AOTF) 110 which generates a corresponding intensity modulation, a delay line 120, and a mirror 130. The delay line 120, which is located between the device 110 and the mirror 130, is used in the system 100 to reduce the intensity modulation generated by the device 110. The length of the delay line 120 can be configured or adjusted based on the frequency of intensity modulation of the device 110 so that the phase difference between the intensity modulation generated directly from the device 110 and the intensity modulation that travels the delay line 120 can be made out of phase and hence the intensity modulation generated by the device 110 can be substantially reduced or canceled out, as illustrated in FIG. 1B. While the method disclosed in the related applications mentioned above can be effective for reducing intensity modulation generated by a single device, such a method may not be effective for reducing intensity modulation generated by multiple devices (e.g., multiple AOTFs) in a system in which each device may have non-negligible finite size and each device may have a different frequency of intensity modulation.

SUMMARY OF THE INVENTION

An apparatus is provided in which multiple devices are connected in series forming a signal path through which a signal propagates. Each device may have one or more operating frequencies and each operating frequency may generate a corresponding intensity modulation with respect to the signal. For one embodiment, the apparatus includes multiple delay lines through which the signal travels. The length of each delay line is configured to reduce the intensity modulation generated by each device based upon one or more factors including the one or more operating frequencies associated with each device and multiple null orders corresponding to different lengths of the delay lines.

Other features and advantages of the present invention will be apparent from the accompanying drawings and from the detailed description which follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1A:
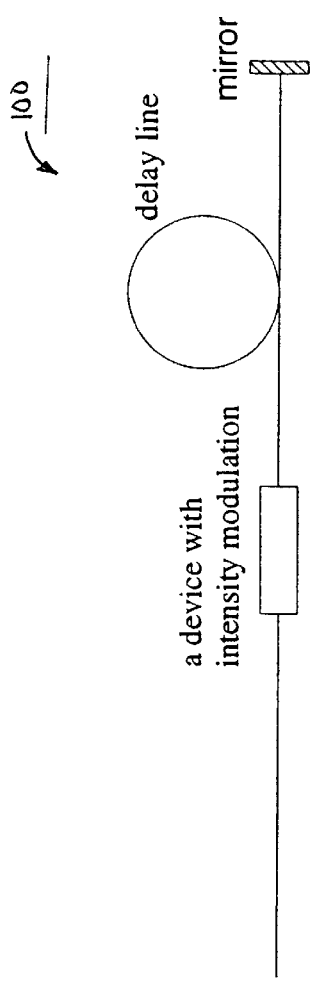
FIG. 1A shows a block diagram of a system that uses a single delay line to reduce intensity modulation generated by a device such as an AOTF.
Figure 1B:
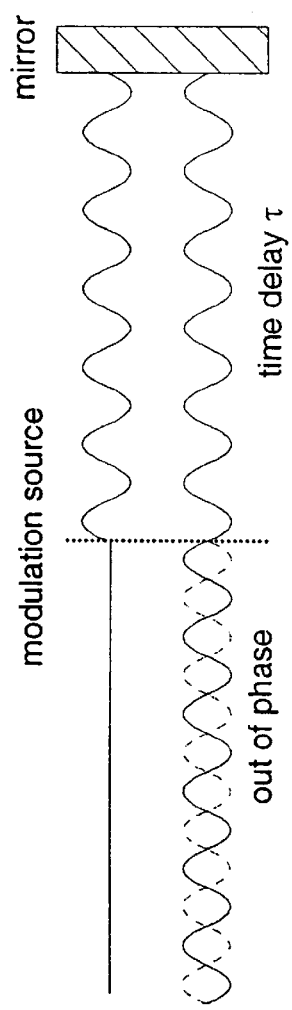
FIG. 1B is a diagram that illustrates the reduction or cancellation of the intensity modulation generated by the device shown in FIG. 1A by using a single delay line.

As described in more detail below, one embodiment of the present invention uses multiple delay lines of various null orders to reduce intensity modulations generated by multiple devices (e.g., AOTFs) that are cascaded or connected in series. As explained herein, if multiple devices that have their own intensity modulation frequencies are used in the system, a single delay line with only one null order cannot reduce all the intensity modulations effectively. Even if the intensity modulation frequencies are the same, a single delay line cannot be used effectively if the size of the device is non-negligible. As described in greater detail below, the use of multiple delay lines with multiple null orders in accordance with one embodiment of the present invention can effectively reduce the intensity modulation generated by each device (e.g., AOTF) in the system.

In the discussion below, a method, apparatus, and system are described for reducing intensity modulation generated by multiple devices by using multiple delay lines of multiple null orders. For one embodiment of the present invention, an apparatus is provided which includes multiple devices connected in series forming a signal path through which a signal propagates, each device having one or more operating frequencies, each operating frequency generating a corresponding intensity modulation with respect to the signal. The apparatus further includes multiple delay lines through which the signal travels, the length of each delay line being configured to reduce the intensity modulation generated by each device based upon one or more factors including the one or more operating frequencies associated with each device and multiple null orders corresponding to different lengths of the delay lines.

For one embodiment, the intensity modulation generated by each device is reduced using a corresponding delay line, the length of the corresponding delay line for each respective device being selected from a set of candidate lengths determined for each respective delay line, based on one or more selection criteria. For one embodiment, the shortest length from the set of candidate lengths for each respective delay line is selected as the length to be used for the respective delay line provided that the difference between any two lengths selected is greater than the length of the corresponding device. For one embodiment, the candidate lengths for each respective delay line can be determined according to the following formula:

$$L_m^k \cong c(2m+1)/(4nf^k)$$

wherein $L_m^k$ represents a candidate length for the respective delay line for the $k^{th}$ device based on the $m^{th}$ null order, c corresponds to light velocity in vacuum, n corresponds to refractive index of the delay line, $f^k$ corresponds to modulation frequency of the $k^{th}$ device, and m=0, 1, 2, . . . , corresponds to integer null order for the respective delay line.

For another embodiment of the present invention, the multiple devices can be arranged as various groups each of which including one or more corresponding devices. In this embodiment, a corresponding delay line is implemented for each respective group of devices. The length of the corresponding delay line is configured based on the frequencies of intensity modulation of the devices in the respective group such that a total number of null orders chosen is minimum with respect to the number of groups of devices. In one embodiment, the length of corresponding delay line is determined based on the lowest and highest frequencies of intensity modulation in the respective group of devices. The length of the delay line for each respective group of devices can be determined according to the following formula:

$$L_{ck} \cong c(2m+1)/4n(f_{ai}+f_{aj})$$

wherein $L_{ck}$ represents the length of the delay line for the $k^{th}$ group, c corresponds to light velocity in vacuum, n corresponds to refractive index of the delay line, $f_{ai}$ corresponds to the highest frequency of intensity modulation in the respective group, and $f_{aj}$ corresponds to the lowest frequency of intensity modulation in the respective group.

For one embodiment, each device may have multiple frequencies of intensity modulation including a first frequency of intensity modulation, a second frequency of intensity modulation, and a third frequency of intensity modulation that corresponds to a difference between the first and second frequencies. In this case, the intensity modulation generated by each device is reduced using a corresponding delay line. The length of the corresponding delay line used for each respective device is determined based on a first length corresponding to the first frequency, a second length corresponding to the second frequency, and a third length corresponding to the third frequency. For one embodiment, the third length is calculated according to the following formula:

$$L_{ct}^k \cong c(2m_{ct}^k+1)/(4n\delta f^k)$$

wherein $L_{ct}^k$ represents a candidate length for the $k^{th}$ device based on the third frequency ($\delta f^k$, $m_{ct}^k$ corresponds to a minimum possible integer null order for the $k^{th}$ device, c corresponds to light velocity in vacuum, n corresponds to refractive index of the delay line. For one embodiment, the first length and the second length are chosen to be closest to the third length calculated and the average of the chosen first length and second length is used as the length of the delay line for the respective device.

While the discussion herein is focused on acousto-optic tunable filters (AOTFs) as examples of devices whose intensity modulation can be reduced using multiple delay lines according to one embodiment of the present invention, alternative embodiments of the present invention are not limited to AOTFs or systems that utilize AOTFs but are also applicable to other types of devices that generate intensity modulation and systems that utilize those types of devices.

As described herein, the length of a delay line for each device (e.g., an AOTF) in an apparatus or system that includes multiple devices (e.g., AOTFs) is computed in a deterministic way that uses not only the first order null but also higher order nulls. For one embodiment, in case of tuning application of AOTF or in case of frequency variation due to environmental fluctuation for fixed frequency application of AOTF, minimum order set of nulls can be chosen to maximize delay lines' ability of intensity modulation reduction over a certain tuning range of frequency.

For one embodiment, a system according to the teachings of the present invention may include multiple devices (e.g., AOTFs) each of which can generate a corresponding intensity modulation with respect to a signal (e.g., an optical signal) that propagates through the system. Such a system or apparatus may include a high reflection optical mirror to reflect back the modulated optical waves and multiple delay lines configured to reduce the intensity modulations generated by the multiple devices (e.g., AOTFs). For one embodiment, the lengths of the multiple delay lines are designed to match each device (e.g., AOTF) with its own null order delay line and hence to reduce intensity modulation most effectively. For one embodiment, the length of each delay line or the distance of each device (e.g., AOTF) from the mirror is computed as $L_m^k \cong c(2m+1)/(4nf^k)$, where c is the light velocity in vacuum, n is the refractive index of the delay path, $f^k$ is the modulation frequency of the $k^{th}$ device, and m=0, 1, 2, . . . is the lowest possible integer number for each device.

Figure 2:
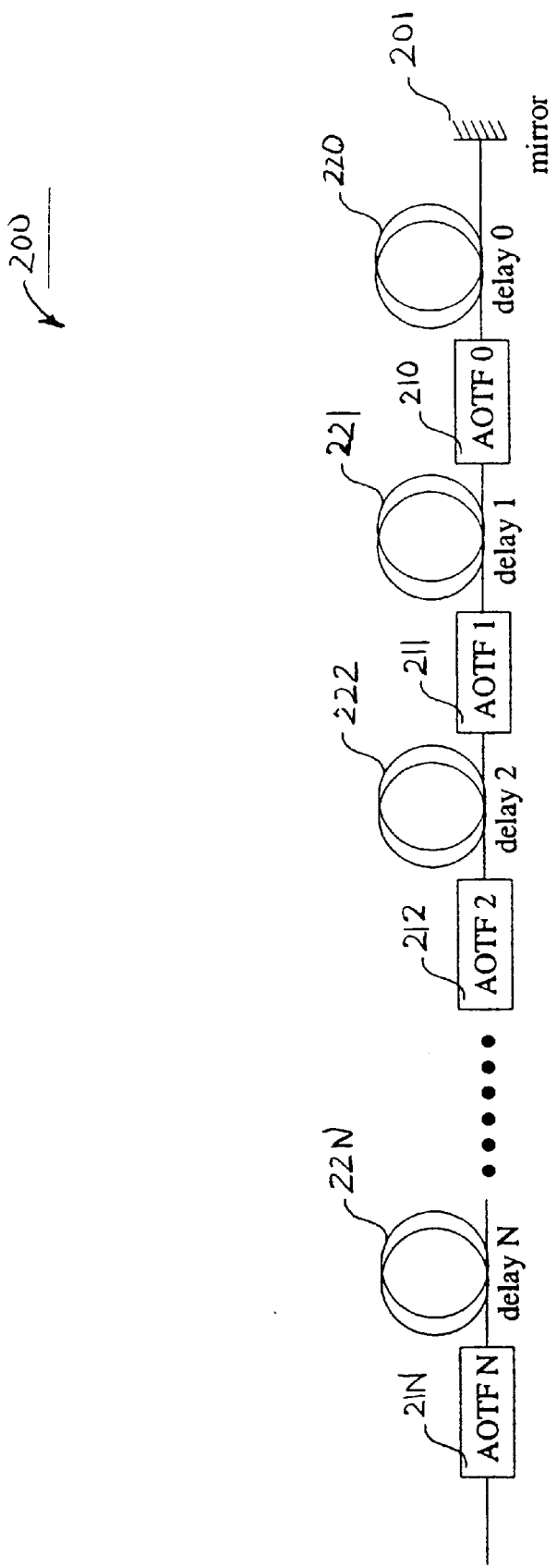
FIG. 2 shows a block diagram of an apparatus/system that utilizes multiple delay lines to reduce the intensity modulation generated by multiple devices, in accordance with one embodiment of the present invention.

FIG. 2 shows a block diagram of an apparatus or system 200 that utilizes multiple delay lines to reduce the intensity modulations generated by multiple devices, in accordance with one embodiment of the present invention. As illustrated in FIG. 2, the apparatus 200 includes an optical mirror 201, a series of AOTFs 210, 211, 212, and 21N, and multiple delay lines 220, 221, 222, and 22N. The multiple delay lines 220–22N and the multiple AOTFs 210–21N can be connected by fusion splicing. For one embodiment, optical mirror 201 can be embodied by right angle cleaved fiber end with high reflection dielectric coating or metal coating that can provide high reflection as high as over 90%. For one embodiment, for the purpose of reducing polarizationdependent loss (PDL) in the apparatus 200, Faraday rotating mirror (FRM) can be used as the optical mirror 201. For one embodiment, 90-degree polarization rotation by the Faraday rotating mirror does not hurt the ability of a delay line to reduce intensity modulation. Other kinds of high reflection fiber mirrors can be used as the optical mirror 201.

For one embodiment, each AOTF in the series of AOTFs 210–21N may have either fixed or tunable single frequency of intensity modulation or multiple tunable frequencies of intensity modulation, in which case a reduction factor can be different. The reduction factor is explained in more detail below.

For one embodiment, the multiple delay lines 210–21N can be embodied by single mode fibers that have very low loss (e.g., ~0.2 dB/km), which are connected to the multiple AOTFs by fusion splicing. The distance between each AOTF and the optical mirror 201 (also referred to as the length of the delay line or simply delay line length) can be determined according to the methods or techniques described in greater detail below, depending on the AOTFs application schemes.

Devices (e.g., AOTFs) Having Single Fixed or Tunable Intensity Modulation Frequency For one embodiment, when each AOTF has single fixed or tunable intensity modulation frequency, its multiple null order delay line length can be calculated according to the following formula:

$$L_m^k \cong c(2m+1)/(4nf^k) \qquad (1.1)$$

where c is the light velocity in vacuum, n is the refractive index of the delay path, $f^k$ is the intensity modulation frequency of the $k^{th}$ AOTF, and m=0, 1, 2, ... is an integer.

For one embodiment, the various lengths corresponding to the multiple null orders for each delay line associated with each AOTF can be computed and tabulated in form of an N by N matrix as shown in Table 1 below. The various lengths illustrated in Table 1 represent the candidate lengths (or simply candidates) to be used for selecting or choosing the desired delay line lengths for the multiple delay lines that are shown in FIG. 2.

TABLE 1

| m  | 0       | 1       | 2       | ... | N       |
|----|---------|---------|---------|-----|---------|
| f0 | $L_0^0$ | $L_1^0$ | $L_2^0$ | ... | $L_N^0$ |
| f1 | $L_0^1$ | $L_1^1$ | $L_2^1$ | ... | $L_N^1$ |
| f2 | $L_0^2$ | $L_1^2$ | $L_2^2$ | ... | $L_N^2$ |
| ... | ...    | ...     | ...     | ... | ...     |
| fN | $L_0^N$ | $L_1^N$ | $L_2^N$ | ... | $L_N^N$ |

For one embodiment, each of the multiple devices or AOTFs has a corresponding single frequency of intensity modulation. For example, a device referred to as $0^{th}$ device has a corresponding frequency of intensity modulation referred to as f0, a device referred to as $2^{nd}$ device has a corresponding frequency of intensity modulation referred to as f2, etc. As such, as illustrated in Table 1, each of the intensity modulation frequencies included in this table (e.g., f0, f1, etc.) corresponds to a particular device (e.g., AOTF). Accordingly, for a delay line associated with an AOTF, various candidate lengths corresponding to the different null orders can be computed based on equation 1.1 shown above. For example, a delay line for the $0^{th}$ device which has a corresponding intensity modulation frequency f0 may have multiple candidate lengths that are computed based on equation 1.1 shown above. As illustrated in Table 1, m=0, 1, 2, ..., N represents the multiple null orders based upon which the multiple candidate lengths for a particular delay line are computed. In this example, for a device having a corresponding intensity modulation frequency f0, the multiple candidate lengths for the corresponding delay line include $L_0^0$, $L_1^0$, $L_2^0$, ..., $L_N^0$. Thus, for N devices each having a corresponding frequency of intensity modulation fi, there are N×N candidates from which the desired lengths for the multiple delay lines can be selected or determined.

From the multiple candidate lengths calculated for each intensity modulation frequency as illustrated in Table 1, the shortest candidate length, if possible, is chosen as the desired length for the respective frequency to minimize the reduction factor for each AOTF. For one embodiment, the lengths chosen or selected also need to satisfy a constraint that the difference between any two lengths is greater than the device length or device size of the AOTF. Based on the above selection criteria or constraints, a set of the minimum delay line lengths can be determined.

Devices or AOTFs Having Multiple Driving Frequencies

When two rf frequencies are applied to an AOTF, there exists cross talk intensity modulation whose frequency is the difference between the two applied frequencies. In this case, each AOTF has three different intensity modulation frequencies: two of them are similar and one is very smaller than the others. In this case, the delay line length for each AOTF is determined and optimized as described in detail below to reduce the corresponding intensity modulations generated by the three different frequencies.

For one embodiment, if the intensity modulations of the $k^{th}$ AOTF are generated by two similar frequencies $f_1^k$, $f_2^k$ and the cross talk frequency $\delta f^k$, the delay line length for the respective AOTF is chosen to be close to the minimum null order delay line length for the cross talk according to the following formula:

$$L_{ct}^k \cong c(2m_{ct}^k+1)/(4n\delta f^k) \qquad (1.2)$$

where $L_{ct}^k$ represents a delay line length for the $k^{th}$ device with respect to the cross talk frequency $\delta f^k$, $m_{ct}^k$ corresponds to a minimum possible integer null order for the cross talk frequency $\delta f^k$ of the $k^{th}$ device, c corresponds to light velocity in vacuum, n corresponds to refractive index of the delay line.

The delay line lengths $L_1^k$ and $L_2^k$ which correspond to the two frequencies $f_1^k$ and $f_2^k$ can be chosen to be closest to the delay line length calculated for the cross talk frequency $L_{ct}^k$, as described above. For one embodiment, the desired delay line length L for the $k^{th}$ AOTF can be determined based on the average of the chosen $L_1^k$ and $L_2^k$ as follows:

$$L \cong (L_1^k + L_2^k)/2 \qquad (1.3)$$

Choosing the desired line length as the average of $L_1^k$ and $L_2^k$ is done to optimize the reduction of the intensity modulations that are generated by the frequencies $f_1^k$, $f_2^k$ and the cross talk frequency $\delta f^k$ associated with the $k^{th}$ AOTF.

For one embodiment, there is a constraint that the difference between any two delay line lengths configured for the multiple devices (e.g., AOTFs) needs to be greater than the device size of AOTF. If it is smaller, the null order number for the cross talk delay line length can be increased to satisfy this constraint.

When more than two rf frequencies are applied to an AOTF, it can be difficult to reduce effectively all the intensity modulations which may include more than one cross talk intensity modulations. In case the cross talk frequencies between nearest two frequencies are the same, the above method can be applied to reduce the intensity modulations. In this case, the desired delay line length L for the $k^{th}$ AOTF can be determined as follows:

$$L \cong (L_1^k + L_2^k + L_3^k + \ldots + L_n^k)/n \qquad (1.4)$$

where $L_1^k, L_2^k, L_3^k, \ldots, L_n^k$ are the delay line lengths which correspond to the multiple frequencies $f_1^k, f_2^k, f_3^k, \ldots, f_n^k$ and are closest to the delay line length calculated for the cross talk frequency.

Theoretical Foundation of the Invention

If an AOTF has transmission $\beta^2$, which is assumed not to change during the time the optical wave travels a reflection system as described above, and an angular frequency of intensity modulation $\omega$ with an amount of modulation index $2\alpha$, the reflected optical wave can be expressed as follows:

$$E\text{out} \cong \beta[1+\alpha e^{i\omega(t+\tau)}]\gamma\beta[1+\alpha e^{i\omega t}]E\text{in} \qquad (1.5)$$

where t is time, $\tau$ is the time delay of the reflection system, $\gamma$ is reflectivity of mirror and Ein and Eout is the incident and reflected optical wave amplitudes, respectively. Assuming small modulation index, $\alpha<<1$, and ignoring higher order terms, the reflected intensity in Equation (1.5) can be approximately calculated as follows:

$$|E\text{out}|^2 \cong \gamma^2 \beta^4 |E\text{in}|^2 [1+4\alpha \cos(\omega\tau/2) \cos(\omega t + \omega\tau/2)] \qquad (1.6)$$

Then the resultant modulation index for the reflected optical intensity is given by $4\alpha \cos(\omega\tau/2)$ and can be eliminated on the condition:

$$\omega\tau \cong (2m+1)\pi \qquad (1.7)$$

where m is an integer.

The delay line length for the intensity modulation can be calculated as follows:

$$L_m \cong c(2m+1)/(4nf) \qquad (1.8)$$

where c is the light speed in vacuum, n is refractive index of delay path, f is the modulation frequency, and m=0, 1, 2, ... is integer null order for the delay. It should be noted that intensity modulation in the AOTF can be reduced or eliminated independently of the reflectivity of the optical mirror. Generally, the drawback of low reflectivity of the optical mirror is high loss in the reflection system.

If the intensity modulation frequency is shifted by an amount of $\Delta f$ from f for some reason (e.g., due to scanning for AOTF), the delay line may not eliminate the intensity modulation completely. Instead, certain amount of reduction for the intensity modulation that depends on $\Delta f$ can be achieved. As a criterion for reduction, a reduction factor can be defined as follows:

$$\cos(\omega\tau/2) \cong \sin[(m+1/2)\pi(\Delta f/f)] \qquad (1.9)$$

If the delay line is perfectly matched, the reduction factor becomes 0, whereas it becomes 1 if the delay line is totally mismatched. The larger an integer m is chosen, the larger the reduction factor $\cos(\omega\tau/2)$ becomes for the same amount of tuning $\Delta f/f$ and hence the less effective the delay line becomes. Thus, an integer for m should be chosen as small as possible.

The length of the each delay line for multiple AOTFs can be determined by Eq. (1.8) with two constraints: one constraint is to minimize the reduction factor as shown in Eq. (1.9) for each AOTF the other constraint is to allow the difference between any two delay line lengths to be longer than the device size of AOTF.

EXAMPLES

The following discussion provides some examples to illustrate various applications and implementations of the present invention. These examples are for the purposes of illustration and explanation of the present invention and should not be construed to limit the scope of the present invention.

Figure 3:
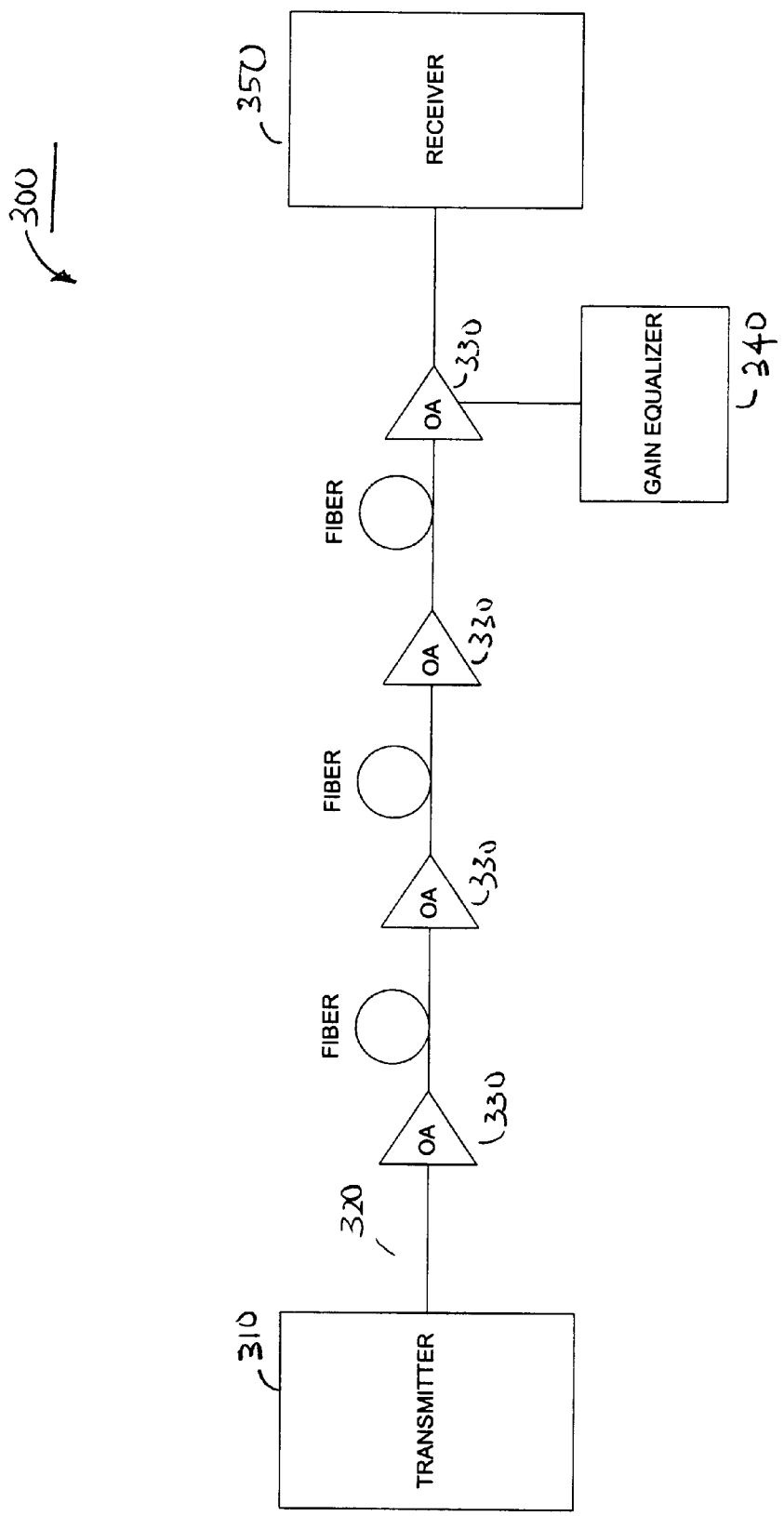
FIG. 3 illustrates a block diagram of one embodiment of an exemplary communication system in accordance with the teachings of the present invention.

FIG. 3 illustrates a block diagram of one embodiment of an exemplary system 300 in accordance with the teachings of the present invention. The system 300 includes a transmitter 310 for transmitting an optical signal over an optical link 320, one or more optical amplifiers 330 (e.g., Erbium doped fiber amplifiers (EDFAs)), a gain flattening equalizer 340 coupled to one of the optical amplifiers 330, and a receiver 350. For one embodiment, the gain flattening equalizer 340 is designed and configured to perform gain equalization in the system 300.

Figure 4:
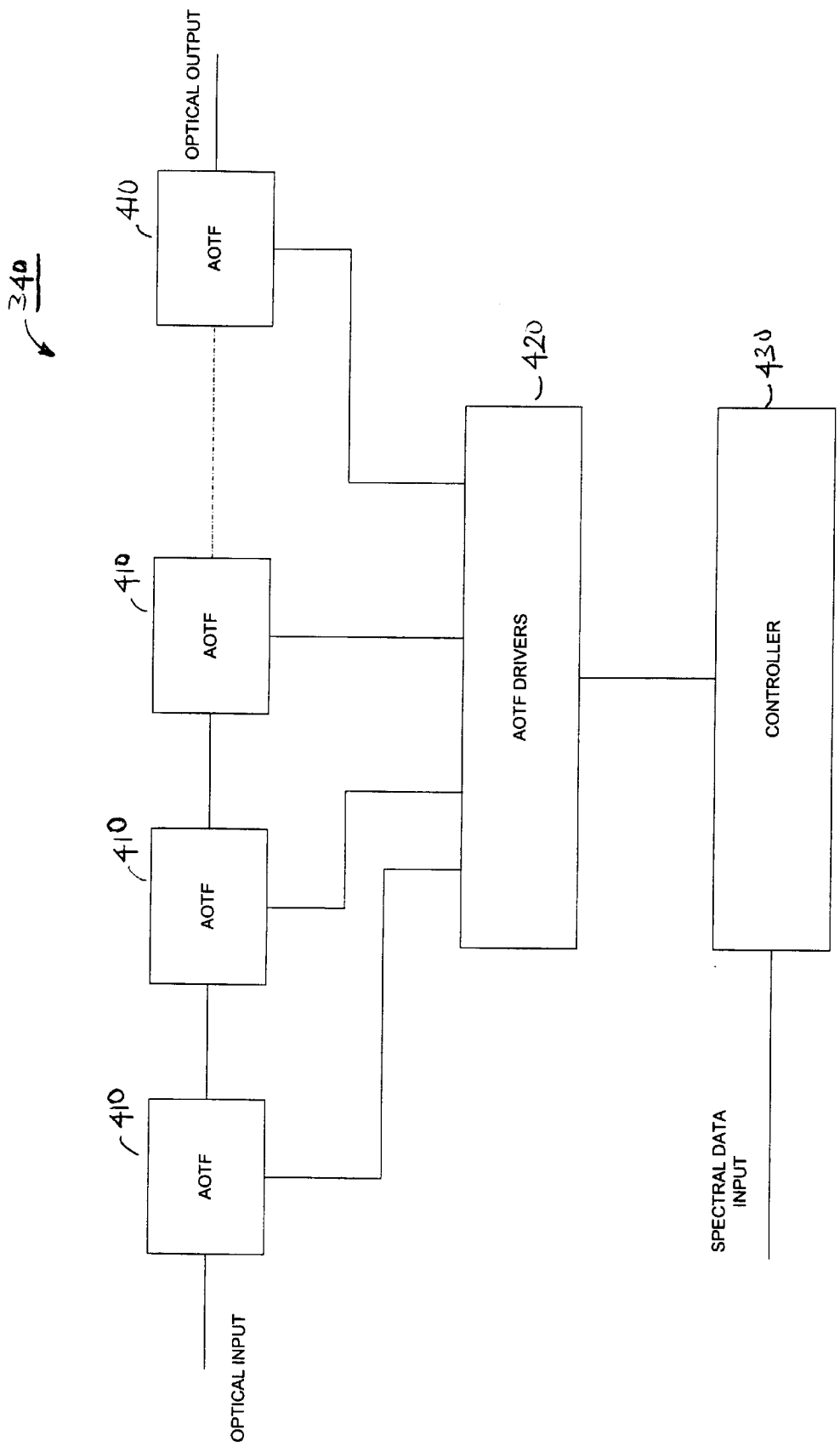
FIG. 4 shows a block diagram of one embodiment of a gain flattening equalizer, according to the teachings of the present invention.

FIG. 4 shows a block diagram of one embodiment of the gain flattening equalizer 340 described in FIG. 3. Equalizer 340 may include eight acousto-optic tunable filters (AOTFs) 410 connected in series that function as optical notch filers to produce a desired attenuation profile over the C- or L-bands. For one embodiment, these AOTFs are coupled to acousto-optic filer drivers 420 (also called RF signal generators) that generate the corresponding RF signals to drive these AOTFs. The drivers 420 may be controlled by a processor or controller 430, based upon spectral data input provided by a spectral monitor (not shown). As described herein, the multiple AOTFs 410 can generate the intensity modulations which can be effectively reduced using the multiple delay lines with multiple null orders.

Scenario 1: AOTFs Having Single Intensity Modulation Frequencies

A fiber AOTF usually has a resonant acoustic frequency in the range of approximately 2 MHz and wavelength coefficient of approximately 5 kHz/nm for LP12 mode in the C-band (e.g., ~1525–1565 nm wavelength), which is generally true for telecommunication single mode fiber.

In the case of a gain flattening equalizer such as the equalizer 340 that has eight AOTFs, 5 nm equal spans can be allocated to each AOTF to cover, whose center is assigned as shown in Table 2. The acoustic frequency corresponding to each center wavelength can be obtained as shown in the second column in Table 2. If the major intensity modulation to be reduced is the $2^{nd}$ harmonic intensity modulation of each AOTF, then the corresponding intensity modulation frequency is equal to twice the acoustic frequency shown in the second column in Table 2. Using the equation (1.8) described above, the multiple delay line lengths to reduce the $2^{nd}$ harmonic intensity modulation for each AOTF are calculated and shown in Table 2. For example, with respect to the acoustic frequency of 2190 kHz, the four different delay line lengths that correspond to the four different null orders $0^{th}$, $1^{st}$, $2^{nd}$, and $3^{rd}$ are $L_0$=11.69, $L_1$=35.06, $L_2$=58.44, and $L_3$=81.82, respectively. With a constraint that the difference between any two delay line lengths selected is greater than the device size of AOTF, which is about 0.75 meters in this example (with the AOTF itself is about 0.15 m and two lead fibers for integration of about 0.6 m), the set of desired delay line lengths is determined such that the center wavelength and null order pair is as follows:
(1527; m=0), (1532; m=1), (1537; m=2), (1542; m=3), (1547; m=3), (1552; m=2), (1557; m=1), (1562; m=0).

In this example, the largest reduction factor based on the selection method described above occurs in the 1547 nm region, where the delay line length is 85.73. In this case, the reduction factor is calculated as 0.066 using Equation (1.9) with the null order m=3 and frequency tuning Δf=12.5 kHz, calculated from the wavelength span +/−2.5 nm and wavelength coefficient df/dλ=5 kHz/nm.

TABLE 2

| Wavelength (nm) | f (kHz) | $L_0$ | $L_1$ | $L_2$ | $L_3$ |
| --- | --- | --- | --- | --- | --- |
| 1527 | 2190 | 11.69 | 35.06 | 58.44 | 81.82 |
| 1532 | 2165 | 11.82 | 35.47 | 59.16 | 82.76 |
| 1537 | 2140 | 11.96 | 35.88 | 59.81 | 83.73 |
| 1542 | 2115 | 12.10 | 36.31 | 60.51 | 84.72 |
| 1547 | 2090 | 12.25 | 36.74 | 61.24 | 85.73 |
| 1552 | 2065 | 12.40 | 37.19 | 61.98 | 86.77 |
| 1557 | 2040 | 12.55 | 37.64 | 62.74 | 87.83 |
| 1562 | 2015 | 12.70 | 38.11 | 63.52 | 88.92 |

For one embodiment, the delay line length assigning method for delay line lengths over C-band (~1525–1565 nm) or L-band ~1570–1610 nm), as described above, can be applied generally for other numbers of AOTFs such as 2N AOTFs. If the AOTFs are numbered in the increasing wavelength order, the AOTF number and null order number can be paired as follows:

(AOTF 1; m=0), (AOTF 2; m=1), ..., (AOTF N−1; m=N−2), (AOTF N; m=N−1), (AOTF N+1; m=N−1), (AOTF N+2; m=N−2), ..., (AOTF 2N−1; m=1), (AOTF 2N; m=0)    (1.10)

The shortest difference between any two delay line lengths for this pairing method can occur either between $L^{AOTF\ 1}_0$ and $L^{AOTF\ 2N}_0$ or between $L^{AOTF\ N}_{N-1}$ and $L^{AOTF\ N+1}_{N-1}$. From the fact that acoustic frequency for LP12 mode is about 2 MHz and wavelength coefficient df/dλ is about 5 kHz/nm for general telecommunication single mode fiber, the shortest length difference can be calculated as follows:

$$|L^{AOTF\ 1}_0 - L^{AOTF\ 2N}_0| = c/(8n)(1/f^{AOTF\ 1} - 1/f^{AOTF\ 2N}) = c/(8n)(df/d\lambda)\Delta\lambda_{1,2N}/(f^{AOTF\ 1}f^{AOTF\ 2N}) = \sim 1\ m,$$

or $$|L^{AOTF\ N}_{N-1} - L^{AOTF\ N+1}_{N-1}| = c(2N-1)/(8n)(1/f^{AOTF\ 1} - 1/f^{AOTF\ 2N}) = c(2N-1)/(8n)(df/d\lambda)\delta\lambda/(f^{AOTF\ N}f^{AOTFN+1}) = \sim 1\ m,$$

where the center wavelength difference between the first AOTF and the last AOTF, referred to as $\Delta\lambda_{1,2N}$, is almost the same as (2N−1) times the unit of spacing δλ(=20/N nm), or about 35–40 nm, and all the frequencies are very similar which are about 2 MHz. Thus, the paired sequence shown in Equation (1.10) can be generally applicable to a device that incorporates fiber AOTFs that are distributed equally in distance over C-band(~1525–1565 nm) or L-band (~1570–1610 nm).

Scenario 2: AOTFs Having Multiple Driving Frequencies

In this scenario, instead of eight AOTFs that use only LP12 mode coupling as described in scenario #1, eight notches for gain equalizer can be provided by four AOTFs that use LP12 and LP13 modes. In this case, the acoustic frequencies to couple LP12 and LP13 modes for each equi-distantly distributed center wavelength in C-band are listed as an example in the 2$^{nd}$ and 3$^{rd}$ columns illustrated in Table 3 below:

TABLE 3

| Wavelength (nm) | $f_{LP12}$ (kHz) | $f_{LP13}$ (kHz) | $L_{CT}$ (m) | $L_{LP12}$ (m) | $L_{LP13}$ (m) | Delay (m) |
| --- | --- | --- | --- | --- | --- | --- |
| 1527 | 2190 | 2630.8 | 116.14 | 105.19 | 107.03 | 106.72 |
| 1532 | 2165 | 2607.8 | 115.61 | 106.41 | 107.97 | |
| 1537 | 2140 | 2584.8 | 115.09 | 107.65 | 108.93 | 108.93 |
| 1542 | 2115 | 2561.8 | 114.59 | 108.92 | 109.91 | |
| 1547 | 2090 | 2538.8 | 114.07 | 110.23 | 110.91 | 111.24 |
| 1552 | 2065 | 2515.8 | 113.56 | 111.56 | 111.92 | |
| 1557 | 2040 | 2492.8 | 113.06 | 112.93 | 112.95 | 113.64 |
| 1562 | 2015 | 2469.8 | 112.56 | 114.33 | 114.00 | |

For one embodiment, the 0$^{th}$ null order delay line length for cross talk between the LP12 and LP13 modes are calculated using Equation (1.8) and listed in the 4$^{th}$ column in Table 3. The closest to these delay line lengths for cross talk, the 4$^{th}$ order delay line lengths for LP12 mode and 5$^{th}$ order delay line lengths for LP13 mode, can be chosen, which are listed in the 5$^{th}$ and 6$^{th}$ columns, respectively, in Table 3. Among 4 candidate length pairs for each AOTF, the pair whose lengths are closest to each other can be chosen. Since each single AOTF provides both LP12 and LP13 mode, the delay line length for the respective AOTF can be optimally chosen as the average of the two lengths in the chosen pair, which is listed in the last column in Table 3. In this example, the differences between adjacent delay lengths are longer than the device size of AOTF (e.g., 0.75 m). In this example, the largest reduction factor for cross talk occurs in the 1532 nm region and is about 0.15. The largest reduction factor for the 2$^{nd}$ harmonic intensity modulation occurs in the 1532 nm region and is about 0.17.

As described in scenario #1 above, it can be seen that, when each AOTF in the series has a single frequency of intensity modulation and assuming that the AOTFs are numbered in increasing wavelength order (which corresponds to decreasing frequency order), the null orders for the multiple AOTFs are selected as follows:
(AOTF 1, m=0); (AOTF 2, m=1); (AOTF 3, m=2); (AOTF 4, m=3); (AOTF 5, m=3); (AOTF 6, m=2); (AOTF 7, m=1); (AOTF 8, m=0)

Figure 5:
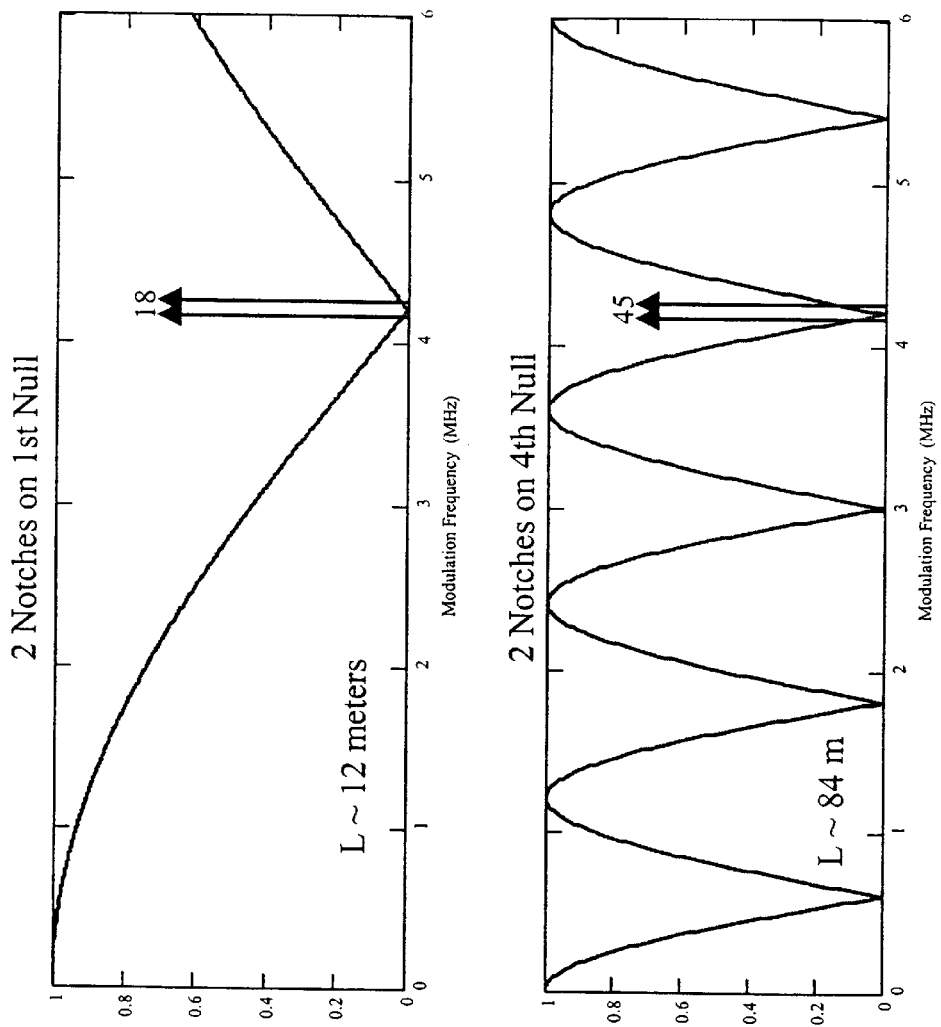
FIG. 5 illustrates the effect on frequency tuning range relative to different null orders according to one embodiment of the present invention.

From the selection or arrangement illustrated above, there are four different null orders that are selected each of which corresponds to two AOTFs. Specifically, the first null order (m=0) is used for AOTF 1 and AOTF 8, the second null order (m=1) is used for AOTF 2 and AOTF 7, the third null order (m=2) is used for AOTF 3 and AOTF 6, and the fourth null order (m=3) is used for AOTF 4 and AOTF 5. While this method and system for reducing intensity modulation of each AOTF in the series by the use of multiple delay lines with different null orders can be very effective, the frequency tuning range for the AOTFs with high order nulls (e.g., fourth null order) is reduced as compared to AOTFs with low order nulls (e.g., first null order). The effect on frequency tuning range with respect to the different null orders is illustrated in FIG. 5. In the configuration described above with respect to scenario #1, two notches (corresponding to AOTF 1 and AOTF 8) are placed on the first null order (m=0) while another two notches (corresponding to AOTF 4 and AOTF 5) are placed on the fourth null order. As shown in FIG. 5, the slope of the curve representing the reduction factor for the fourth null order is about 7 times steeper than the slope of the curve representing the reduction factor for the first null order. Thus the frequency tuning range for the fourth null order is reduced compared to the frequency tuning range for the first null order.

Figure 6:
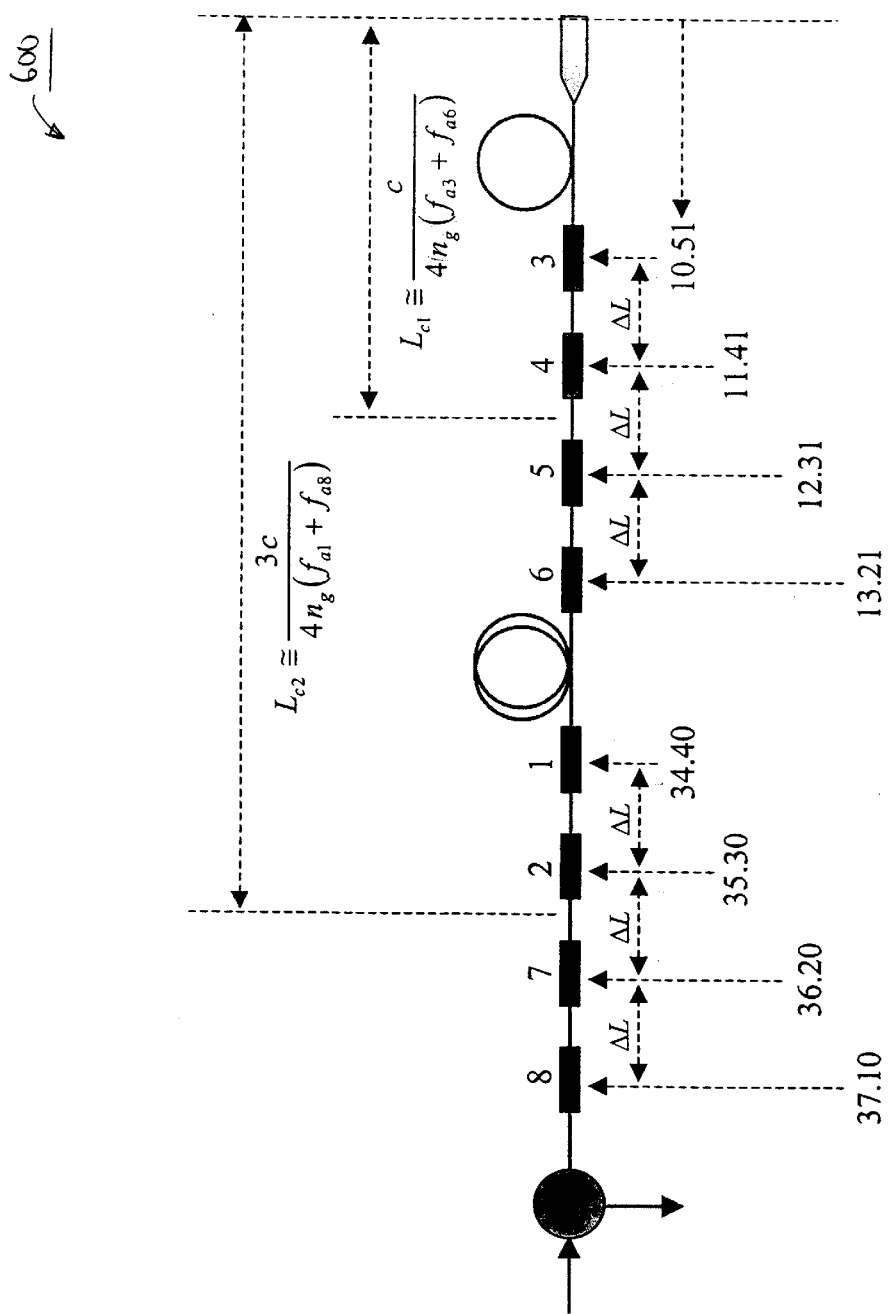
FIG. 6 illustrates a block diagram of an apparatus/system in accordance with another embodiment of the present invention.

FIG. 6 illustrates a block diagram of an apparatus or system 600 in accordance with another embodiment of the present invention. In this embodiment, instead of using four different null orders as described above with respect to FIG. 2 and scenario #1, only the first and second null orders are used in the configuration illustrated in FIG. 6 to minimize the impact on frequency tuning range that occurs when high null orders (e.g., fourth null order) are used. As illustrated in FIG. 6, the apparatus 600 includes 8 AOTFs operating in the C-band with the corresponding wavelengths shown in Table 4 below:

TABLE 4

| AOTF number K | Wavelength λ |
|---|---|
| 1 | 1530 |
| 2 | 1535 |
| 3 | 1539 |
| 4 | 1544 |
| 5 | 1548 |
| 6 | 1553 |
| 7 | 1557 |
| 8 | 1562 |

In this example, the various AOTFs are numbered in an order of increasing wavelength (or decreasing frequency). For one embodiment, to minimize the number of null orders used for the multiple delay line lengths in this configuration, the $3^{rd}$ $4^{th}$, $5^{th}$, and $6^{th}$ AOTFs (also referred to as a first group) are placed with respect to the first null order while the $1^{st}$, $2^{nd}$, $7^{th}$, and $8^{th}$ AOTFs (also referred to as a second group) are placed with respect to the second null order. In other words, the distance between each AOTF in the first group and the optical mirror 601 is determined using first order null while the distance between each AOTF in the second group and the optical mirror 601 is determined using second order null. Thus the distance between a particular AOTF and the optical mirror (also called the length of the delay line) can be determined based on the frequencies of the AOTFs in the respective group and the relative order of the respective group. For example, first null order is used for the first group, second null order is used for the second group, etc.

Referring again to FIG. 6, the distance from the center of each group to the optical mirror 601 can be determined according to the following formula:

$$L_{ck} \cong c(2m+1)/4n(f_{ai}+f_{aj}) \quad (1.11)$$

where $L_{ck}$ represents the length of the delay line for the $k^{th}$ group from the center of the group, c corresponds to light velocity in vacuum, n corresponds to refractive index of the delay line, $f_{ai}$ corresponds to the highest frequency of intensity modulation in the respective group, $f_{aj}$ corresponds to the lowest frequency of intensity modulation in the respective group, and m=k (e.g., 1 for the first group, 2 for the second group, etc.)

In this example, the distance from the center of the first group can be determined as follows:

$$L_{c1} \cong c/4n(f_{a3}+f_{a6})$$

where $f_{a3}$ corresponds to the intensity modulation frequency of the $3^{rd}$ AOTF and $f_{a6}$ corresponds to the intensity modulation frequency of the $6^{th}$ AOTF.

Similarly, the distance from the center of the second group can be determined as follows:

$$L_{c2} \cong 3c/4n(f_{a1}+f_{a8})$$

where $f_{a1}$ corresponds to the intensity modulation frequency of the $1^{st}$ AOTF and $f_{a8}$ corresponds to the intensity modulation frequency of the $8^{th}$ AOTF.

For one embodiment, the distance from each individual AOTF to the optical mirror (also called the delay line length for the respective AOTF) can then be determined based on the group center distance as calculated above. In this configuration, after the distance from the center of each group has been determined, the placement of each individual AOTF in the respective group can be configured using an increment factor called ΔL which can be set based on various considerations depending on the various applications and implementations of the present invention. For example, the increment factor ΔL can be set based on the size or length of the AOTFs, how long the lead fibers need to be for integration, etc.). In this example, ΔL is set to be approximately 90 cm. Accordingly, the placement of each individual AOTF in each group from the center of the respective group can be determined based the increment factor ΔL, as illustrated in FIG. 6 which shows the desired distance between each individual AOTF and the optical mirror 601, assuming that the major intensity modulation to be reduced is the $2^{nd}$ harmonic intensity modulation of each AOTF in which case the intensity modulation frequency of each AOTF is twice the corresponding acoustic frequency generated by each AOTF.

Figure 7:
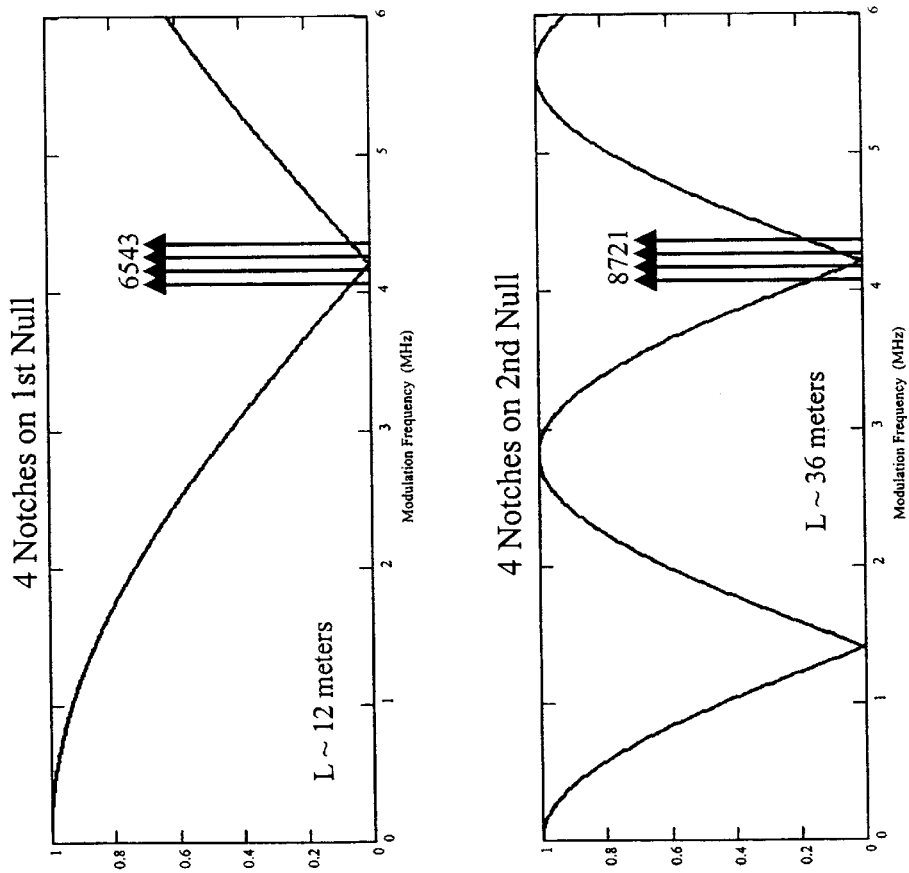
FIG. 7 illustrates the effect on frequency tuning range relative to first and second null orders according to another embodiment of the present invention.

FIG. 7 illustrates the placements of the multiple AOTFs described in FIG. 6 above and the effect on the frequency tuning range relative to the first and second null orders. As shown in FIG. 7, the placements of the $3^{rd}$, $4^{th}$, $5^{th}$, and $6^{th}$ AOTFs are configured based on the first null order. The placements of the $1^{st}$, $2^{nd}$, $7^{th}$, and $8^{th}$ AOTFs are configured based on second null order. It can be seen from FIG. 7 that the slope of the curve representing the reduction factor for the four notches on the second null in this configuration is much less steep compared to the curve representing the notches on the fourth null that is illustrated in FIG. 5 above.

While the above examples are discussed with respect to the reduction of $2^{nd}$ harmonic intensity modulation, embodiments of the present invention are not limited to reduction of $2^{nd}$ harmonic intensity modulation and are fully applicable to reduction of other harmonic intensity modulations such as the $1^{st}$ harmonic intensity modulation, etc.

Figure 8:
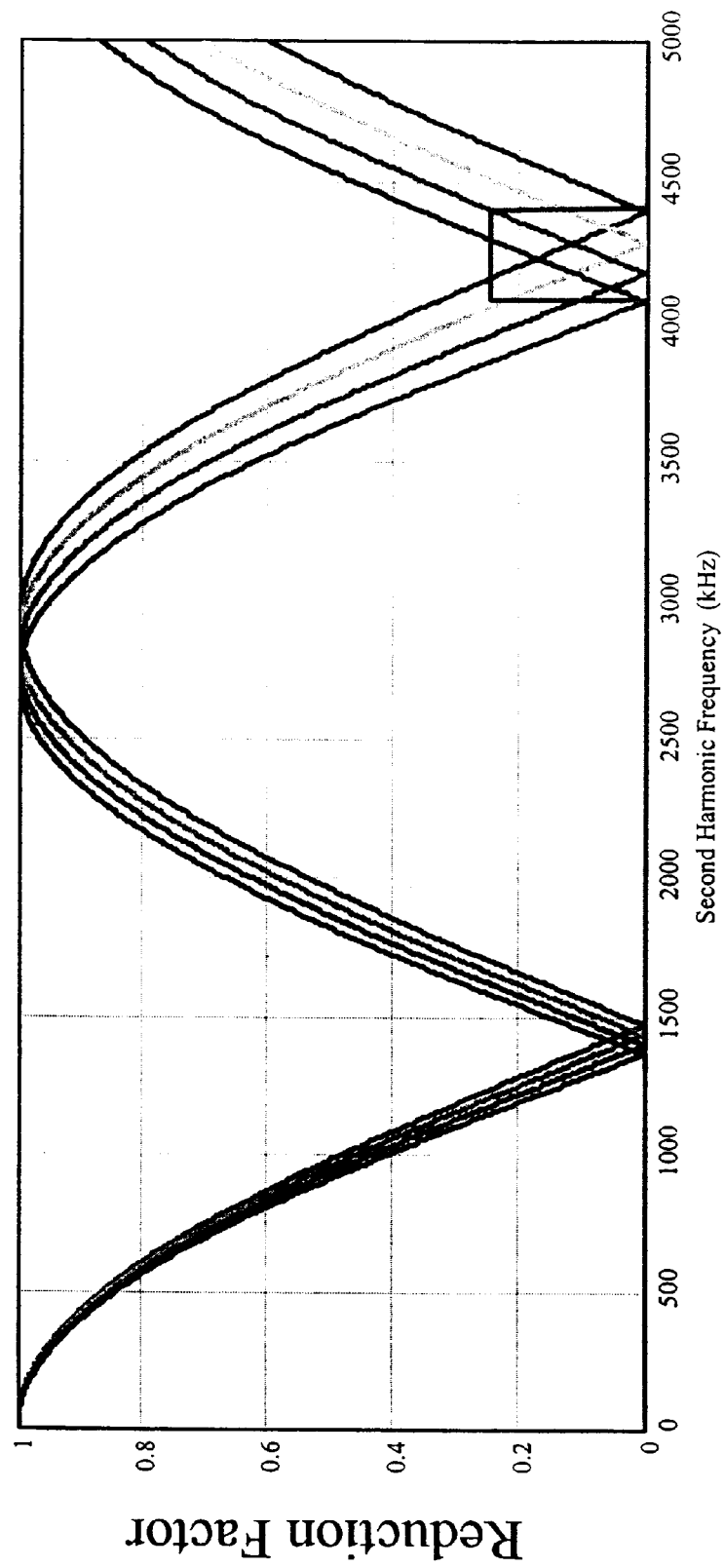
FIGS. 8 and 9 show diagrams of various curves representing the reduction factor with respect to four AOTFs that are placed on second null order, in accordance with the teaching of the present invention.
Figure 9:
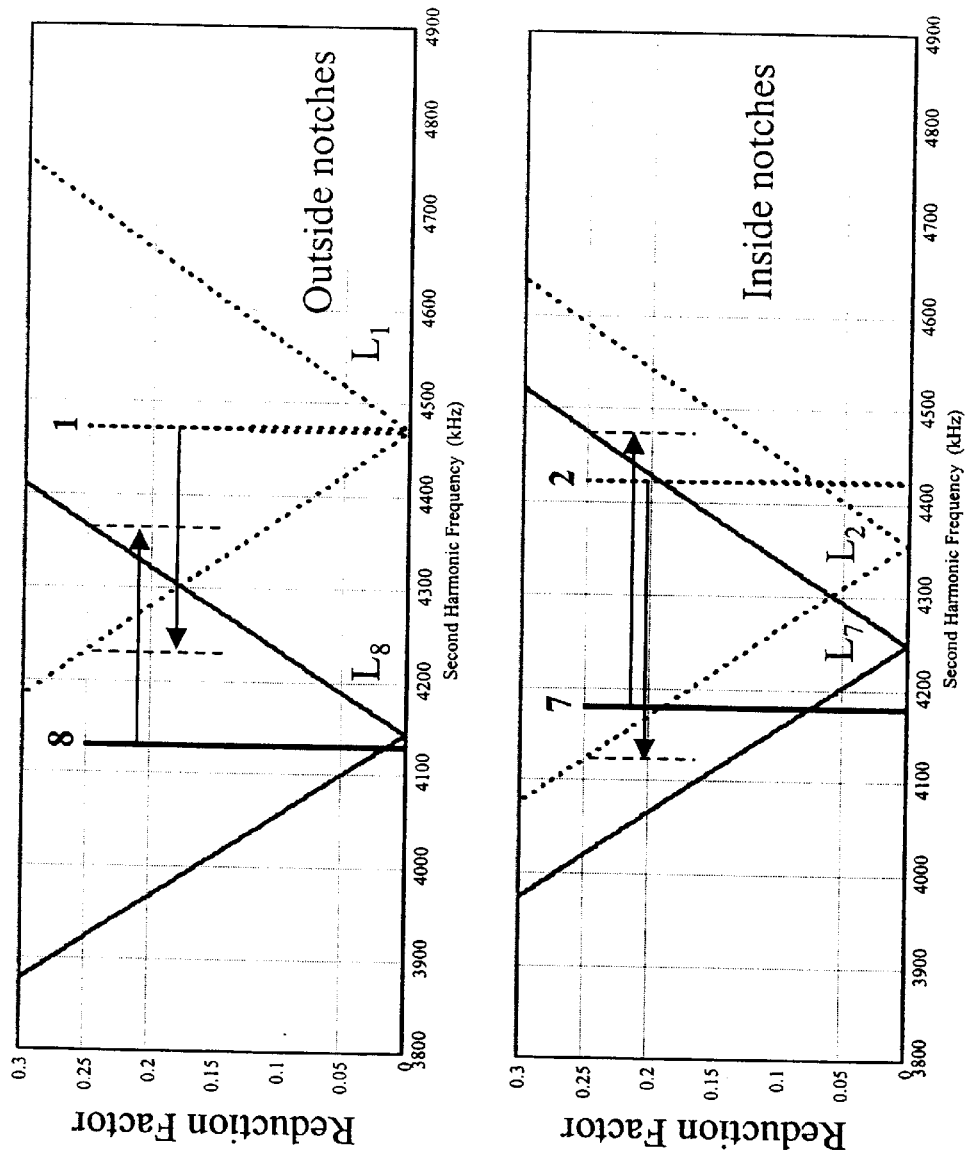

FIG. 8 shows a diagram of the curves representing the reduction factor with respect to the four AOTFs that are placed on second null order (the $1^{st}$, $2^{nd}$, $7^{th}$, and $8^{th}$ AOTFs that are shown in FIG. 6). The box 810 represents a frequency tuning range with respect to these four AOTFs. As such, to maintain effective reduction of intensity modulation, the frequencies of these four AOTFs should not vary outside of this range. FIG. 9 shows more detailed diagrams of the four curves depicted in FIG. 8. As shown in FIG. 9, corresponding to the second harmonic intensity modulation, the frequency tuning range for the four AOTFs in this example is between 4130 and 4470 Khz, approximately, with the outside notches corresponding to the $1^{st}$ and $8^{th}$ AOTFs and the inside notches corresponding to the $2^{nd}$ and $7^{th}$ AOTFs.

Figure 10:
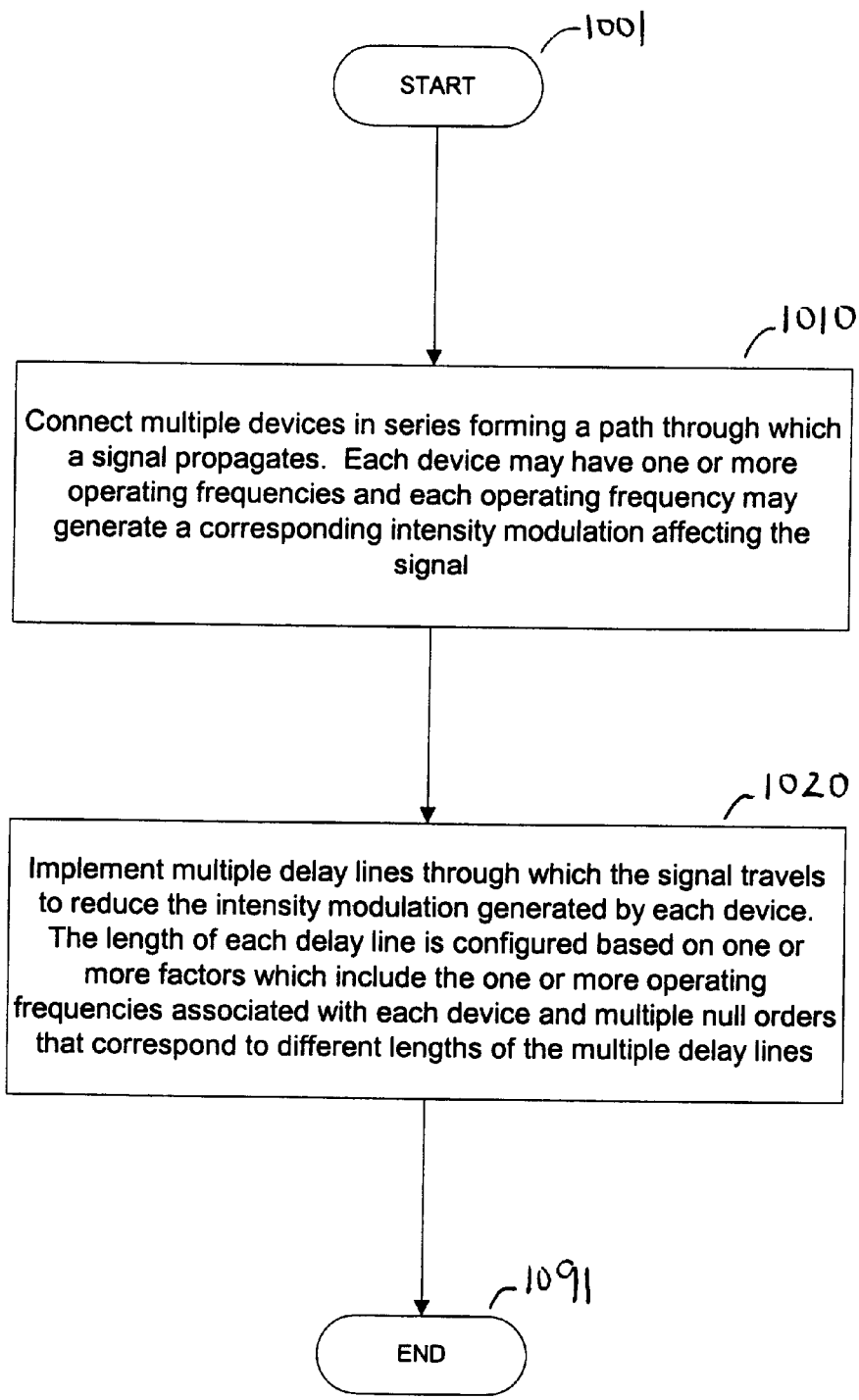
FIG. 10 illustrates a flow diagram of one embodiment of a method according to the teachings of the present invention.

FIG. 10 shows a flow diagram of a method for reducing intensity modulation of multiple AOTFs in accordance with one embodiment of the present invention. At block 1010, multiple devices are connected in series forming a path through which a signal propagates. For one embodiment, each device may have one or more operating frequencies and each operating frequency may generate a corresponding intensity modulation affecting the signal. At block 1020, multiple delay lines are implemented through which the signal travels to reduce the intensity modulation generated by each device. For one embodiment, the length of each delay line is configured based on one or more factors which include the one or more operating frequencies associated with each device and multiple null orders that correspond to different lengths of the multiple delay lines.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An apparatus comprising:

multiple devices connected in series forming a signal path through which a signal propagates, each device having one or more operating frequencies, each operating frequency generating a corresponding intensity modulation with respect to the signal; and multiple delay lines through which the signal travels, the length of each delay line being configured to reduce the intensity modulation generated by each device based upon one or more factors including the one or more operating frequencies associated with each device and multiple null orders corresponding to different lengths of the delay lines.

2. The apparatus of claim 1 wherein a higher null order corresponds to a longer length of the respective delay line.

3. The apparatus of claim 1 wherein the intensity modulation generated by each device is reduced using a corresponding delay line, the length of the corresponding delay line for each respective device being selected from a set of candidate lengths determined for each respective delay line, based on one or more selection criteria.

4. The apparatus of claim 3 wherein the shortest length from the set of candidate lengths for each respective delay line is selected as the length to be used for the respective delay line provided that the difference between any two lengths selected is greater than the length of the corresponding device.

5. The apparatus of claim 4 wherein the candidate lengths for each respective delay line is determined according to the following formula:

$$L_m^k \approx c(2m+1)/(4nf^k)$$

wherein $L_m^k$ represents a candidate length for the respective delay line for the $k^{th}$ device based on the $m^{th}$ null order, c corresponds to light velocity in vacuum, n corresponds to refractive index of the delay line, $f^k$ corresponds to modulation frequency of the $k^{th}$ device, and m=0, 1, 2, . . . , corresponds to integer null order for the respective delay line.

6. The apparatus of claim 5 wherein the multiple devices are numbered according to an order of increasing wavelengths corresponding to the multiple devices and wherein the delay line lengths are selected based on the following pairing of the devices' numbers and the multiple null order numbers:

(device 1; m=0), (device 2; m=1), . . . , (device N−1; m=N−2), (device N; m=N−1), (device N+1; m=N−1), (device N+2; m=N−2), . . . , (device 2N−1; m=1), (device 2N; m=0.

7. The apparatus of claim 1 wherein the multiple devices are arranged as groups each of which including one or more corresponding devices and wherein a corresponding delay line is implemented for each respective group of devices, the length of the corresponding delay line being configured based on the frequencies of intensity modulation of the devices in the respective group.

8. The apparatus of claim 7 wherein the length of the corresponding delay line is configured such that a total number of null orders chosen is minimum with respect to the number of groups of devices.

9. The apparatus of claim 7 wherein the length of corresponding delay line is determined based on the lowest and highest frequencies of intensity modulation in the respective group of devices.

10. The apparatus of claim 9 wherein the groups of devices are numbered in an increasing order, the length of the delay line for each respective group is determined based on a null order that corresponds to the relative order of the respective group.

11. The apparatus of claim 10 wherein the length of the delay line for each respective group of devices is determined according to the following formula:

$$L_{ck} \approx c(2m+1)/4n(f_{ai}+f_{aj})$$

wherein $L_{ck}$ represents the length of the delay line for the $k^{th}$ group, c corresponds to light velocity in vacuum, n corresponds to refractive index of the delay line, $f_{ai}$ corresponds to the highest frequency of intensity modulation in the respective group, and $f_{aj}$ corresponds to the lowest frequency of intensity modulation in the respective group.

12. The apparatus of claim 11 wherein the multiple devices comprise a total of eight devices, the eight devices being arranged as first and second groups each having four devices, each device having a corresponding frequency of intensity modulation.

13. The apparatus of claim 12 wherein the eight devices are numbered in increasing order of frequencies, a device with the highest frequency of intensity modulation being considered the $1^{st}$ device and a device with the lowest frequency of intensity modulation being considered the $8^{th}$ device, and wherein the first group including the $3^{rd}$, $4^{th}$, $5^{th}$, and $6^{th}$ devices, and the second group including the $1^{st}$, $2^{nd}$, $7^{th}$, and $8^{th}$ devices.

14. The apparatus of claim 1 wherein each device has multiple frequencies of intensity modulation including a first frequency of intensity modulation, a second frequency of intensity modulation, and a third frequency of intensity modulation that corresponds to a difference between the first and second frequencies, and wherein the intensity modulation generated by each device is reduced using a corresponding delay line, the length of the corresponding delay line used for each respective device being determined based on a first length corresponding to the first frequency, a second length corresponding to the second frequency, and a third length corresponding to the third frequency.

15. The apparatus of claim 14 wherein the third length is calculated according to the following formula:

$$L_{ct}^k \approx c(2m_{ct}^k+1)/(4n\delta f^k)$$

wherein $L_c^k$ represents a candidate length for the $k^{th}$ device based on the third frequency $\delta f^k$, $m_{ct}^k$ corresponds to a minimum possible integer null order for the $k^{th}$ device, c corresponds to light velocity in vacuum, n corresponds to refractive index of the delay line.

16. The apparatus of claim 15 wherein the first length and the second length are chosen to be closest to the third length calculated.

17. The apparatus of claim 16 wherein a length which corresponds to an average of the chosen first length and second length is used as the length of the delay line for the respective device.

18. The apparatus of claim 17 wherein the lengths of the delay lines for the multiple devices are configured such that the difference between any two lengths is greater than the length of the corresponding device.

19. The apparatus of claim 18 wherein the multiple devices comprise acousto-optic tunable filters.

20. The apparatus of claim 1 wherein the length of each delay line is configured such that a first intensity modulation generated by a corresponding device is reduced by a second intensity modulation that propagates through the respective delay line due to a phase difference between the first intensity modulation and the second intensity modulation associated with the corresponding device.

21. The apparatus of claim 20 wherein the phase difference is configured such that the first intensity modulation and the second intensity modulation associated with the corresponding device are substantially out of phase.

22. A method comprising:
connecting multiple devices in series forming a signal path through which a signal propagates, each device having one or more operating frequencies, each operating frequency generating a corresponding intensity modulation with respect to the signal; and
implementing multiple delay lines through which the signal travels, the length of each delay line being configured to reduce the intensity modulation generated by each device based upon one or more factors including the one or more operating frequencies associated with each device and multiple null orders corresponding to different lengths of the delay lines.

23. The method of claim 22 wherein each device has a corresponding single frequency of intensity modulation and wherein implementing includes:
determining a set of candidate lengths for each delay line; and
selecting, from the set of candidate lengths for each delay line, the shortest length to be used for the respective delay line.

24. The method of claim 23 wherein the lengths are selected such that the difference between any two lengths selected is greater than the length of the corresponding device.

25. The method of claim 24 wherein the candidate lengths for the respective delay line is determined according to the following formula:

$$L_m^k \cong c(2m+1)/(4nf^k)$$

wherein $L_m^k$ represents a candidate length for the respective delay line for the $k^{th}$ device based on the $m^{th}$ null order, c corresponds to light velocity in vacuum, n corresponds to refractive index of the delay line, $_k$ corresponds to modulation frequency of the $k^{th}$ device, and m=0, 1, 2, . . . , corresponds to integer null order for the respective delay line.

26. The method of claim 23 wherein selecting includes:
constructing an N by N matrix containing the candidate lengths for each intensity modulation frequency corresponding to multiple null orders.

27. The method of claim 26 wherein the multiple devices are numbered according to an order of increasing wavelengths corresponding to the multiple devices and wherein the delay line lengths are selected based on the following pairing of the devices' numbers and the multiple null order numbers:
(device 1; m=0), (device 2; m=1), . . . , (device N−1; m=N−2), (device N; m=N−1), (device N+1; m=N−1), (device N+2; m=N−2), . . . , (device 2N−1; m=1), (device 2N; m=0.

28. The method of claim 22 wherein implementing includes:
arranging the multiple devices into a plurality of groups each of which including one or more devices; and
configuring a corresponding delay line for each group of devices, the length of the corresponding delay line being determined based on the frequencies of intensity modulation of the devices in the respective group.

29. The method of claim 28 wherein the length of the corresponding delay line is determined such that a total number of null orders chosen is minimum with respect to the number of groups of devices.

30. The method of claim 28 further including:
determining the length of the corresponding delay line based on the lowest and highest frequencies of intensity modulation in the respective group of devices.

31. The method of claim 28 wherein the groups of devices are numbered in an increasing order, the length of the delay line for each respective group is determined based on a null order which corresponds to the relative order of the respective group.

32. The method of claim 31 wherein the length of the delay line for each respective group of devices is determined according to the following formula:

$$L_{ck} \cong c(2m+1)/4n(f_{ai}+f_{aj})$$

wherein $L_{ck}$ represents the length of the delay line for the $k^{th}$ group, c corresponds to light velocity in vacuum, n corresponds to refractive index of the delay line, $f_{ai}$ corresponds to the highest frequency of intensity modulation in the respective group, and $f_{aj}$ corresponds to the lowest frequency of intensity modulation in the respective group.

33. The method of claim 31 wherein the multiple devices comprise a total of eight devices, the eight devices being arranged as first and second groups each having four devices, each device having a corresponding frequency of intensity modulation.

34. The method of claim 33 wherein the eight devices are numbered in increasing order of frequencies, a device with the highest frequency of intensity modulation being considered the $1^{st}$ device and a device with the lowest frequency of intensity modulation being considered the $8^{th}$ device, and wherein the first group including the $3^{rd}$, $4^{th}$, $5^{th}$, and $6^{th}$ devices, and the second group including the $1^{st}$, $2^{nd}$, $7^{th}$, and $8^{th}$ devices.

35. The method of claim 22 wherein each device has multiple frequencies of intensity modulation including a first frequency of intensity modulation, a second frequency of intensity modulation, and a third frequency of intensity modulation which corresponds to the difference between the first and second frequencies, and wherein implementing includes:
(a) determining multiple delay line lengths with respect to the corresponding third frequency of intensity modulation for each device;
(b) determining first and second delay line lengths corresponding to the first and second frequencies of intensity modulation, respectively, such that the first and second delay line lengths are closest to the minimum null order delay line length for the third frequency; and (c) choosing a length that corresponds to the average of the first and second delay line lengths as the delay line length for the respective device.

36. The method of claim 35 further including:

(d) determining whether the difference between any two delay line lengths determined in (c) is greater than the size of the device; and (e) if the difference is not greater than the size of the device, increasing the null order for the delay line length for the third frequency and repeating (a) through (c).

37. The method of claim 22 wherein the multiple devices comprise acousto-optic tunable filters.

38. The method of claim 22 wherein the length of each delay line is configured such that a first intensity modulation generated by a corresponding device is reduced by a second intensity modulation that propagates through the respective delay line due to a phase difference between the first intensity modulation and the second intensity modulation associated with the corresponding device.

39. The method of claim 38 wherein the phase difference is determined such that the first intensity modulation and the second intensity modulation associated with the corresponding device are substantially out of phase.

40. A system comprising:

a transmitter;

an apparatus coupled to the transmitter, the apparatus including:

multiple devices connected in series forming a signal path through which a signal propagates, each device having one or more operating frequencies, each operating frequency generating a corresponding intensity modulation with respect to the signal; and multiple delay lines through which the signal travels, the length of each delay line being configured to reduce the intensity modulation generated by each device based upon one or more factors including the one or more operating frequencies associated with each device and multiple null orders corresponding to different lengths of the delay lines; and a receiver coupled to the apparatus.

41. The system of claim 40 wherein a higher null order corresponds to a longer length of the respective delay line.

42. The system of claim 41 wherein the shortest length from the set of candidate lengths for each respective delay line is selected as the length to be used for the respective delay line provided that the difference between any two lengths selected is greater than the length of the corresponding device.

43. The system of claim 42 wherein the candidate lengths for each respective delay line is determined according to the following formula:

$$L_m^k \cong c(2m+1)/(4nf^k)$$

wherein $L_m^k$ represents a candidate length for the respective delay line for the $k^{th}$ device based on the $m^{th}$ null order, c corresponds to light velocity in vacuum, n corresponds to refractive index of the delay line, $f^k$ corresponds to modulation frequency of the $k^{th}$ device, and $m=0, 1, 2, \ldots$, corresponds to integer null order for the respective delay line.

44. The system of claim 43 wherein the multiple devices are numbered according to an order of increasing wavelengths corresponding to the multiple devices and wherein the delay line lengths are selected based on the following pairing of the devices' numbers and the multiple null order numbers:

(device 1; m=0), (device 2; m=1), ..., (device N−1; m=N−2), (device N; m=N−1), (device N+1; m=N−1), (device N+2; m=N−2), ..., (device 2N−1; m=1), (device 2N; m=0.

45. The system of claim 40 wherein the intensity modulation generated by each device is reduced using a corresponding delay line, the length of the corresponding delay line for each respective device being selected from a set of candidate lengths determined for each respective delay line, based on one or more selection criteria.

46. The system of claim 40 wherein the multiple devices are arranged as groups each of which including one or more corresponding devices and wherein a corresponding delay line is implemented for each respective group of devices, the length of the corresponding delay line being configured based on the frequencies of intensity modulation of the devices in the respective group.

47. The system of claim 46 wherein the length of the corresponding delay line is configured such that a total number of null orders chosen is minimum with respect to the number of groups of devices.

48. The system of claim 46 wherein the length of corresponding delay line is determined based on the lowest and highest frequencies of intensity modulation in the respective group of devices.

49. The system of claim 46 wherein the groups of devices are numbered in an increasing order, the length of the delay line for each respective group is determined based on a null order that corresponds to the relative order of the respective group.

50. The system of claim 49 wherein the length of the delay line for each respective group of devices is determined according to the following formula:

$$L_{ck} \cong c(2m+1)/4n(f_{ai}+f_{aj})$$

wherein $L_{ck}$ represents the length of the delay line for the $k^{th}$ group, c corresponds to light velocity in vacuum, n corresponds to refractive index of the delay line, $f_{ai}$ corresponds to the highest frequency of intensity modulation in the respective group, and $f_{aj}$ corresponds to the lowest frequency of intensity modulation in the respective group.

51. The system of claim 46 wherein the multiple devices comprise a total of eight devices, the eight devices being arranged as first and second groups each having four devices, each device having a corresponding frequency of intensity modulation.

52. The system of claim 51 wherein the eight devices are numbered in increasing order of frequencies, a device with the highest frequency of intensity modulation being considered the $1^{st}$ device and a device with the lowest frequency of intensity modulation being considered the $8^{th}$ device, and wherein the first group including the $3^{rd}$, $4^{th}$, $5^{th}$, and $6^{th}$ devices, and the second group including the $1^{st}$, $2^{nd}$, $7^{th}$, and $8^{th}$ devices.

53. The system of claim 40 wherein each device has multiple frequencies of intensity modulation including a first frequency of intensity modulation, a second frequency of intensity modulation, and a third frequency of intensity modulation that corresponds to a difference between the first and second frequencies, and wherein the intensity modulation generated by each device is reduced using a corresponding delay line, the length of the corresponding delay line used for each respective device being determined based on a first length corresponding to the first frequency, a second length corresponding to the second frequency, and a third length corresponding to the third frequency.

54. The system of claim 53 wherein the third length is calculated according to the following formula:

$$L_{ct}^k \cong c(2m_{ct}^k+1)/(4n\delta f^k)$$

wherein $L_{ct}^k$ represents a candidate length for the $k^{th}$ device based on the third frequency $\delta f^k$, $m_{ct}^k$ corresponds to a minimum possible integer null order for the $k^{th}$ device, c corresponds to light velocity in vacuum, n corresponds to refractive index of the delay line.

55. The system of claim 54 wherein the first length and the second length are chosen to be closest to the third length calculated.

56. The system of claim 55 wherein a length which corresponds to an average of the chosen first length and second length is used as the length of the delay line for the respective device.

57. The system of claim 56 wherein the lengths of the delay lines for the multiple devices are configured such that the difference between any two lengths is greater than the length of the corresponding device.

58. The system of claim 40 wherein the multiple devices comprise acousto-optic tunable filters.

59. The system of claim 40 wherein the length of each delay line is configured such that a first intensity modulation generated by a corresponding device is reduced by a second intensity modulation that propagates through the respective delay line due to a phase difference between the first intensity modulation and the second intensity modulation associated with the corresponding device.

60. The system of claim 59 wherein the phase difference is configured such that the first intensity modulation and the second intensity modulation associated with the corresponding device are substantially out of phase.

* * * * *